UNITED STATES PATENT OFFICE.

HENRY WILLIAM COUPE ANNABLE, OF LONDON, ENGLAND, ASSIGNOR TO THE FERRO ALLOYS SYNDICATE LIMITED, OF LONDON, ENGLAND.

MANUFACTURE OF FERRO-MOLYBDENUM.

No. 852,920.　　　Specification of Letters Patent.　　　Patented May 7, 1907.

Application filed November 1, 1906. Serial No. 341,650.

*To all whom it may concern:*

Be it known that I, HENRY WILLIAM COUPE ANNABLE, a subject of the King of Great Britain and Ireland, residing at the Tungsten and Rare Metals Company Limited, Queen's Road, Battersea, in the county of London, England, chemist, have invented certain new and useful Improvements in the manufacture of Ferro-Molybdenum, of which the following is a specification.

The object of this invention is to produce, from molybdenite, ferro-molybdenum free from sulfur and other impurities.

Molybdenite is an ore which consists essentially of sulfid of molybdenum. I mix this ground ore with an alkaline carbonate or alkaline hydrate, or a mixture of both, (broadly covered by the word alkali in my claim) such as sodium-carbonate, or caustic soda, for example, and I heat the mixture to a temperature just above the melting point of the bath, and, while heating I cause air with, or without, a little steam, to come freely into contact with the charge.

For the purpose of heating the charge, I prefer to utilize a reverberatory furnace, such that the fire gases and products of combustion, mingled with oxygen in excess of that which is sufficient for the combustion of the fuel, pass over the charge which is spread on the bed of the furnace, and which is raked from time to time to insure uniformity of heating throughout the charge and to facilitate the contact of the oxygen in the fire gases and products of combustion with every particle of the charge.

In order to avoid volatilization of molybdenum, the heat must be carefully controlled, as no part of the charge must be allowed to attain a temperature greatly in excess of the melting point of the bath, though, to effect complete oxidation, the whole charge must be melted. The effect is to oxidize the sulfur and molybdenum and cause them to combine with the alkali.

The charge, (which, presuming caustic soda to be used, for example, now consists of a mixture of sulfate of sodium, molybdate of sodium and free sodium hydroxid mixed with the unattacked portion of the ore), is withdrawn from the furnace and is crushed and then is thrown into water which is preferably heated.

The sulfate of sodium and the molybdate of sodium and free sodium hydroxid are soluble and the solution of these is separated from the insoluble matter, the insoluble matter being thoroughly washed with water to remove all traces of the soluble salts and the weak solutions thus obtained can be utilized in the next charge.

The strong solution of molybdate of sodium and sulfate of sodium and free sodium hydroxid is heated and to it is added a solution of an iron salt, such, for example, as ferric-chlorid, ferric sulfate, ferrous chlorid, or ferrous sulfate, (or mixtures of these), until no further precipitate is formed. After completion of the precipitation wash the precipitate, preferably with hot water, any number of times that may be advisable.

In order to hasten the washing, I may employ mechanical means of separating the solution from the precipitate. The precipitate thus obtained consists of molybdate of iron, and, by carefully carrying out the operation as hereinbefore described, it can be produced as a pure product free from sulfur. The molybdate of iron is dried and, to reduce it to ferro-molybdenum, it may be heated to a low red heat in a furnace without admixture of carbon and then be reduced to ferro-molybdenum by a current of a suitable gas, such as coal, producer, or water-gas, the heat being maintained until the gas evolved ceases to contain products of deoxidation. The ferro-molybdenum is then allowed to cool in contact with the reducing gas.

In place of carrying out the reduction of the molybdate of iron to ferro-molybdenum, as hereinbefore described, the molybdate of iron can be mixed with sufficient pure oxid of iron to produce, after reduction, a ferro-molybdenum which is fusible at a white heat, (from 1300° to 1400° centigrade), and with sufficient carbonaceous matter to reduce the oxids of iron and molybdenum to ferro-molybdenum and the mixture can be heated in the upper of two refractory receptacles, the upper one having an opening at bottom and being placed over the lower one, which contains oxid of iron, these receptacles being heated to a white heat so that the ferro-molybdenum drops from the upper vessel and percolates through the oxid of iron and is obtained free, or practically free, from carbon.

Having now particularly described and ascertained the nature of my said invention and in what manner the same is to be performed, I declare that what I claim is:—

The manufacture of ferro-molybdenum from molybdenite by heating the molybdenite with alkali in the presence of oxygen and preparing from the product a solution containing molybdate of the alkali employed, precipitating this by means of a salt of iron, and so obtaining molybdate of iron and then reducing this to ferro-molybdenum, substantially as hereinbefore described.

In testimony whereof I have signed this specification in the presence of two subscribing witnesses.

HENRY WILLIAM COUPE ANNABLE.

Witnesses:
WILLIAM GERALD REYNOLDS,
GILBERT FLETCHER TYSON.